United States Patent
Krishnapuram et al.

(10) Patent No.: US 8,131,039 B2
(45) Date of Patent: Mar. 6, 2012

(54) SYSTEM AND METHOD FOR MULTIPLE-INSTANCE LEARNING FOR COMPUTER AIDED DIAGNOSIS

(75) Inventors: Balaji Krishnapuram, King of Prussia, PA (US); Vikas C. Raykar, Conshohocken, PA (US); Murat Dundar, Malvern, PA (US); R. Bharat Rao, Berwyn, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 831 days.

(21) Appl. No.: 12/238,536

(22) Filed: Sep. 26, 2008

(65) Prior Publication Data

US 2009/0080731 A1    Mar. 26, 2009

Related U.S. Application Data

(60) Provisional application No. 60/975,331, filed on Sep. 26, 2007.

(51) Int. Cl.
*G06K 9/00*    (2006.01)
(52) U.S. Cl. .................................... 382/128; 382/160
(58) Field of Classification Search .............. 382/128, 382/132, 159, 160
See application file for complete search history.

(56) References Cited

U.S. PATENT DOCUMENTS

| | | | | |
|---|---|---|---|---|
| 2006/0224539 A1* | 10/2006 | Zhang et al. | | 706/20 |
| 2007/0189602 A1* | 8/2007 | Rao et al. | | 382/159 |
| 2008/0125643 A1* | 5/2008 | Huisman et al. | | 600/420 |
| 2009/0297007 A1* | 12/2009 | Cosatto et al. | | 382/131 |

* cited by examiner

*Primary Examiner* — Andrew W Johns
(74) *Attorney, Agent, or Firm* — Peter Robert Withstandley

(57) ABSTRACT

A method for training a classifier for classifying candidate regions in computer aided diagnosis of digital medical images includes providing a training set of images, each image including one or more candidate regions that have been identified as suspicious by a computer aided diagnosis system. Each image has been manually annotated to identify malignant regions. Multiple instance learning is applied to train a classifier to classify suspicious regions in a new image as malignant or benign by identifying those candidate regions that overlap a same identified malignant region, grouping each candidate region that overlaps the same identified malignant region into a same bag, and maximizing a probability $$P = \prod_{i=1}^{N} p_i^{y_i}(1-p_i)^{1-y_i},$$

wherein N is a number of bags, $p_i$ is a probability of bag i containing a candidate region that overlaps with an identified malignant region, and $y_i$ is a label where a value of 1 indicates malignancy and 0 otherwise.

20 Claims, 12 Drawing Sheets

| Dataset | $d$ | positive | | negative | |
|---|---|---|---|---|---|
| | | examples | bags | examples | bags |
| Musk1 | 166 | 207 | 47 | 269 | 45 |
| Musk2 | 166 | 1017 | 39 | 5581 | 63 |
| Elephant | 230 | 762 | 100 | 629 | 100 |
| Tiger | 230 | 544 | 100 | 676 | 100 |

| Set | MIRVM | RVM | MiBoost | MILR | MISVM | MI |
|---|---|---|---|---|---|---|
| Musk1 | 0.942 | 0.951 | 0.899 | 0.846 | 0.899 | 0.922 |
| Musk2 | 0.987 | 0.985 | 0.964 | 0.795 | - | 0.982 |
| Elephant | 0.962 | 0.979 | 0.828 | 0.814 | 0.959 | 0.953 |
| Tiger | 0.980 | 0.970 | 0.890 | 0.890 | 0.945 | 0.956 |

FIG. 6

| Dataset | Number of features | selected by RVM | selected by MI RVM | selected by MI Boost |
|---|---|---|---|---|
| Musk1 | 166 | 39 | 14 | 33 |
| Musk2 | 166 | 90 | 17 | 32 |
| Elephant | 230 | 42 | 16 | 33 |
| Tiger | 230 | 56 | 19 | 37 |

SYSTEM AND METHOD FOR MULTIPLE-INSTANCE LEARNING FOR COMPUTER AIDED DIAGNOSIS

CROSS REFERENCE TO RELATED UNITED STATES APPLICATIONS

This application claims priority from "An Improved Multiple Instance Classification Algorithm for Computer Aided Diagnosis", U.S. Provisional Application No. 60/975,331 of Krishnapuram, et al., filed Sep. 26, 2007, the contents of which are herein incorporated by reference in their entirety.

TECHNICAL FIELD

This disclosure is directed to the classification of candidate regions in computer aided diagnosis.

DISCUSSION OF THE RELATED ART

In computer aided diagnosis (CAD) the goal is to detect potentially malignant nodules, tumors, emboli, or lesions in medical images, such as those acquired through computed tomography (CT), X-ray, MRI etc. A CAD system aids the radiologist by marking the location of likely anomaly on a medical image. FIG. 1 shows sample pulmonary emboli in a lung CT scan along with those candidates 11, 12, 13, 14 which point to it. PE (blood clots in the lung) is a potentially life-threatening condition. An early and accurate diagnosis is the key to survival.

Most CAD systems include the following three steps. (1) Candidate generation: this step identifies potentially unhealthy regions of interest. While this step can detect most of the anomalies, the number of false positives can be high, e.g., 60-100 false positives/patient. (2) Feature computation: computation of a set of descriptive morphological features for each of the candidates. (3) Classification: labeling of each candidate as a nodule or not by a classifier. A classifier should be able to reduce the number of false positives without appreciable decrease in the sensitivity.

To train a classifier, a set of CT scans is collected from hospitals. These scans are then read by expert radiologists who mark the pulmonary emboli locations. This constitutes a ground truth for learning. The candidate generation step generates many potential candidates. During the development of a training set, a CG runs on a set of cases, and then features are extracted for the candidates identified in this stage. Next, one identifies which of these candidates is close to or overlaps with a radiologist marked ground-truth lesion. These are labeled as positive candidates, and the rest are labeled as negative. During this process, one obtains information about which candidates point to the same underlying ground-truth lesion. Based on a set of features computed for these candidates, a classifier can be trained.

Many off-the-shelf classifier learning algorithms have been used for the design of CAD algorithms, e.g., support vector machines (SVM), neural networks (NN), etc. However, the derivations behind most of these algorithms make unwarranted assumptions that are violated in CAD data sets. For example, most classifier-learning algorithms assume that the training samples are independent and identically distributed (i.i.d.). However, there are high levels of correlations among the suspicious locations from, e.g., the same region of a breast, both within a breast image, and across multiple images of the same breast, so the training samples are not independent.

Further, these standard algorithms try to maximize classification accuracy over all candidates. However, this particular accuracy measure is not very relevant for CAD. For example, often several candidates generated from the CG point to the same underlying lesion in a breast. Even if one of these is highlighted to the radiologist and other adjacent or overlapping candidates are missed, the underlying lesion (hence the patient or image) would have been detected. Hence, CAD system accuracy is measured in terms of Free-Response Operator Characteristic (FROC) curves, plotting per-image (or per-patient sensitivity when multiple images are available for a patient), versus false-alarms (FA) per-case. This is only loosely related to the accuracy-measure optimized by off-the-shelf methods.

Previous work has shown that modeling CAD classifier learning as a multiple-instance learning (MIL) task largely alleviates the above concerns. In a single instance learning scenario one is given a training set $D=\{(x_i,y_i)\}_{i=1}^{N}$ containing N instances, where $x_i \in X$ is an instance (the feature vector) and $y_i \in Y=\{0,1\}$ is the corresponding known label. The task is to train a classification function $f: X \rightarrow Y$.

In the multiple instance learning framework the training set is made up of bags. A bag contains many instances. All the instances in a bag share the same bag-level label. A bag is labeled positive if it contains at least one positive instance. A negative bag means that all instances in the bag are negative. The task is to train a classification function that can predict the labels of unseen instances and/or bags.

MIL is a natural framework to model many real-life tasks, such drug activity prediction, image retrieval, face detection, scene classification, text categorization, etc., and is often found to be superior to a conventional supervised learning approaches. Many variants of standard single instance learning algorithms, such as like Boosting, SVMs, Logistic Regression, nearest neighbor, etc., have been modified to adapt to the MIL scenario.

In computer aided diagnosis (CAD), the task is to build a classifier to predict whether or not a suspicious region (instance) on a computed tomography (CT) scan is a pulmonary embolism/nodule/lesion. That this is a suitable MIL task may be seen by recognizing that all instances which are within a certain distance to a radiologist mark (ground truth) can be considered as a positive bag.

SUMMARY OF THE INVENTION

Exemplary embodiments of the invention as described herein generally include methods and systems for training a classifier for classify features in computer aided diagnosis of digital medical images that use information about the number of candidate regions that overlap a same identified malignant region to train a classifier. The images in the training set each including one or more candidate regions that have been identified as suspicious by a candidate generation step of a computer aided diagnosis system, and each image has been manually annotated by an expert, such as a radiologist, to identify malignant regions. Multiple instance learning (MIL) is applied to the training of the classifier by first identifying and grouping into a bag those candidate regions that overlap a same identified malignant region, and grouping those that dos not overlap any identified malignant region into their own bags. Then, a probability of being malignant or benign is associated with each bag, and this probability is maximized over all images of the training set. An exemplary, non-limiting probability model is a logistic regression, modeled by a sigmoid $\sigma(w_i^T x_i)=1/(1+\exp(-w_i^T x_i))$ where x is a d-dimensional feature vector associated with each candidate region, and w is a weight vector that weights the contribution of each component of x. The probability can be optimized by a method such as the Newton-Raphson method. The weights are associated with a zero-mean Gaussian prior $N(w|0,A^{-1})$ with an inverse covariance matrix $A=\text{diag}(\alpha_1 \ldots \alpha_d)$. The diagonal elements of A can be optimized by maximizing a marginal likelihood of A over the training data.

A method according to an embodiment of the invention uses Logistic Regression as a baseline, single instance, classifier, but also directly enforces the definition that at least one of the instances in a positive bag is positive. A learning algorithm according to an embodiment of the invention relies on the Bayesian automatic relevance determination paradigm to select the relevant subset of features that is most useful for accurate multiple instance classification, so that automatic feature selection and classifier design can be performed jointly. A method according to an embodiment of the invention can be extended to statistically exploit information from other data sets while learning multiple related classifiers, which can improve accuracy in real-life problems with limited training data.

Unlike previous learning algorithms that minimize the candidate level misclassification error, an algorithm according to an embodiment of the invention can optimize the patient-wise sensitivity. An algorithm according to an embodiment of the invention can also automatically selects a small subset of statistically useful features, is faster in terms of run-time, utilizes all of the available training data without the need for cross-validation, etc., needs no specialized optimization packages, needs no parameter tuning on validation sets (or cross-validation), and requires no human hand tuning or intervention.

Experimental results indicate that an MIL method according to an embodiment of the invention is more accurate than state of the art MIL algorithms both on benchmark data sets and on real life CAD problems, and selects a much smaller set of useful features than that selected in a corresponding single instance learning algorithm. Inductive transfer further improves the accuracy of the classifier in data poor CAD applications as compared to learning each task individually. Experiments also show that on some multiple instance benchmarks, a single instance classifier is slightly more accurate. While MI Boost also does feature selection, results indicate that an approach according to an embodiment of the invention is more accurate than MI Boost. For all domains, the number of features selected by an algorithm according to an embodiment of the invention is smaller than that for the corresponding single instance classifier. Further, there is no known previous work which accomplishes inductive transfer in the context of multiple-instance classification.

According to an aspect of the invention, there is provided a method for training a classifier for classifying candidate regions in computer aided diagnosis of digital medical images, the method including providing a training set of images, each said image including one or more candidate regions that have been identified as suspicious by a candidate generation step of a computer aided diagnosis system, and wherein each said image has been manually annotated to identify malignant regions, and using information about the number of candidate regions that overlap a same identified malignant region to train a classifier, wherein said classifier is adapted to classifying a suspicious region in a new image as malignant or benign.

According to a further aspect of the invention, training the classifier comprises identifying those candidate regions that overlap a same identified malignant region, grouping each candidate region that overlaps the same identified malignant region into a same bag, grouping each candidate region that does not overlap any identified malignant region into its own bag, associating a probability to each bag as being malignant or benign, and maximizing this probability over all images of the training set.

According to a further aspect of the invention, the method includes deriving a set of d-dimensional descriptive feature vectors x from a feature computation step of a computer aided diagnosis system, wherein each candidate region is associated with a feature vector x, and wherein a probability that a bag is malignant is $$p(y=1 \mid x) = 1 - \prod_{j=1}^{K} [1 - p(y=1 \mid x_j)],$$

wherein $y \in \{0,1\}$ is a label where a value of 1 indicates malignancy and 0 otherwise, bag $x=\{x_j\}_{j=1}^{K}$ contains K feature vectors $x_j$, and a probability that a bag is benign is $$p(y=0 \mid x) = \prod_{j=1}^{K} p(y=0 \mid x_j),$$

and the probability to be maximized is $$\log \prod_{i=1}^{N} p_i^{y_i}(1-p_i)^{1-y_i} = \sum_{i=1}^{N} [y_i \log p_i + (1-y_i)\log(1-p_i)],$$

wherein N is a number of bags.

According to a further aspect of the invention, maximizing the probability comprises modeling said probability $p_i$ as a logistic sigmoid $\sigma(w_i^T x_i)=1/(1+\exp(-w_i^T x_i))$ wherein w is a weight vector that weights the contribution of each component of x, wherein w has a zero-mean Gaussian prior $N(w|0, A^{-1})$ with an inverse covariance matrix $A=\text{diag}(\alpha_1 \ldots \alpha_d)$, and finding a w that minimizes $$L(w) = \left[\sum_{i=1}^{N}(y_i \log p_i + (1-y_i)\log(1-p_i))\right] - \frac{w^T A w}{2}.$$

According to a further aspect of the invention, minimizing L(w) comprises performing a Newton-Raphson update $w \leftarrow w - \eta H^{-1} g$, wherein g is a gradient of L(w), H is a Hessian matrix of L(w), and $\eta$ is a step size, wherein w is updated until a ratio $\|g\|/d$ is less than a predetermined constant.

According to a further aspect of the invention, the method includes finding $\alpha_i$ that maximizes a marginal likelihood $p(D|A)$ of A over said training bags D defined as $$p(D \mid A) = \int \left(\prod_{i=1}^{N} p_i^{y_i}(1-p_i)^{1-y_i}\right)(N(w \mid 0, A^{-1}))dw,$$

and removing a feature weight vector $w_i$ if an associated $\alpha_i$ is greater than a predetermined threshold value, wherein a remaining set of features weight vectors w is a weight vector for a linear classifier $f_w(x)=w^T x$.

According to a further aspect of the invention, finding $\alpha_i$ that maximizes p(D|A) comprises calculating a Hessian matrix $H(\hat{w}_{MAP}, A)$ of p(D|A), and updating said hyper-parameters from $$\alpha_i^{new} = \frac{1}{w_i^2 + \Sigma_{ii}},$$

wherein $\Sigma_{ii}$ is the $i^{th}$ diagonal element of $H^{-1}(\hat{w}_{MAP}, A)$, and wherein $\Sigma_{ii}$ does not depend on A.

According to a further aspect of the invention, the method includes providing one or more additional training sets of $M^j$ bags $\{x_i^j\}_{i=1}^{M^j}$, finding $w^j$ that maximizes $$\left[\sum_{i=1}^{N}(y_i^j \log p_i^j + (1-y_i^j)\log(1-p_i^j))\right] - \frac{w^{j,T}Aw^j}{2},$$

wherein $$p_i^j = 1 - \prod_{k \in i}[1 - \sigma(w^{j,T}x_{ik}^j)],$$

and updating $$\alpha_i^{new} = \frac{1}{\sum_{task\ j}((w_i^j)^2 + \Sigma_{ii}^j)},$$

wherein $w_i^j$ is an $i^{th}$ feature weight vector of a $j^{th}$ training set, $\Sigma_{ii}$ is the $i^{th}$ diagonal element of an inverse Hessian matrix $H^{-1}$ of p(D|A), and wherein $\Sigma_{ii}$ does not depend on A.

According to a further aspect of the invention, the method includes repeating the finding of w that minimizes L(w) for each $\alpha_i \in \{\alpha_1, \ldots, \alpha_d\}$, and repeating said steps of finding $w_i$ for each $\alpha_i$, finding the $\alpha_i$ that maximizes said marginal likelihood p(D|A), and removing a feature vector $x_i$ until the $\alpha_i$'s have converged in value.

According to another aspect of the invention, there is provided a program storage device readable by a computer, tangibly embodying a program of instructions executable by the computer to perform the method steps for training a classifier for classifying candidate regions in computer aided diagnosis of digital medical images.

BRIEF DESCRIPTION OF THE DRAWINGS

FIG. 6 is a table of AUC values for the various algorithms and datasets used in the MIL experiments, according to an embodiment of the invention.

FIG. 7 is a table of the average number of features selected per fold by the different algorithms used in the MIL experiments, according to an embodiment of the invention.

DETAILED DESCRIPTION OF EXEMPLARY EMBODIMENTS

Figure 1:
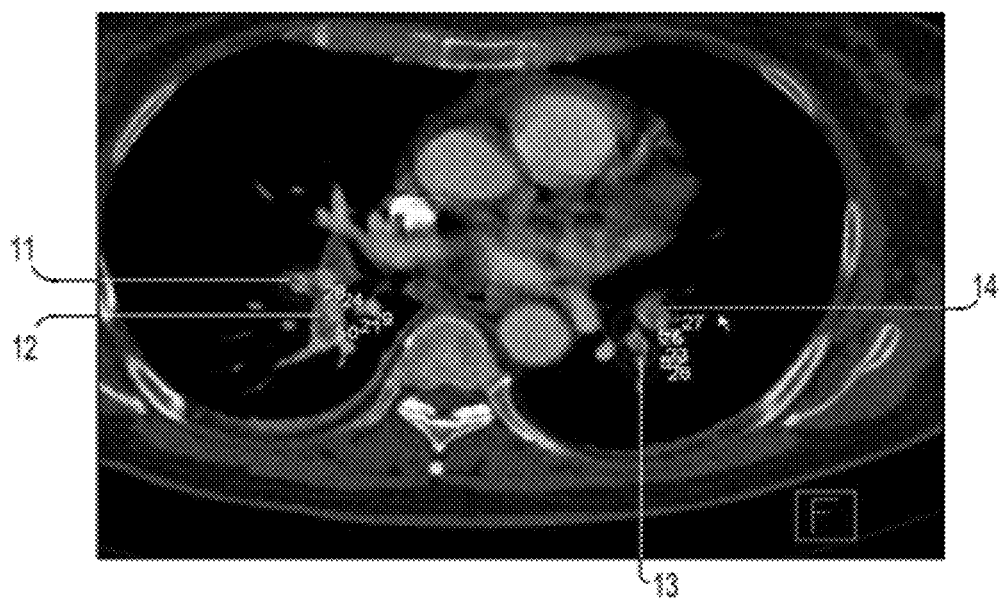
FIG. 1 depicts a sample pulmonary emboli in a Lung CT scan, according to an embodiment of the invention.

Exemplary embodiments of the invention as described herein generally include systems and methods for the classification of candidate regions in computer aided diagnosis. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Notation

An instance is represented as a feature vector $x \in R^d$. A bag which contains K instances is denoted by boldface $x = \{x_j \in R^d\}_{j=1}^K$. The label of a bag is denoted by $y \in \{0,1\}$.

The training data D has N bags $\{x_i, y_i\}_{i=1}^N$, where $x_i = \{x_{ij} \in R^d\}_{j=1}^{K_i}$, is a bag containing $K_i$ instances that share the same label $y \in \{0,1\}$. Thus $x_{ij}$ refers to the $i^{th}$ candidate in the $j^{th}$ bag.

Classifier: consider the family of linear discriminating functions $F = \{f_w\}$, where for any $x, w \in R^d$, $f_w(x) = w^T x$. final classifier can be written in the following form $$y = \begin{cases} 1 & \text{if } w^T x > \theta \\ 0 & \text{if } w^T x < \theta \end{cases}. \quad (1)$$

Ties are resolved by flipping a fair coin. A threshold parameter $\theta$ determines the operating point of the classifier. The ROC curve is obtained as $\theta$ is swept from $-\infty$ to $\infty$. A bag is labeled positive if at least one instance is positive and negative if all instances are negative. Training a classifier implies choosing the weight vector w given the training data D.

Multiple Instance Learning for Classifiers

Figure 2:
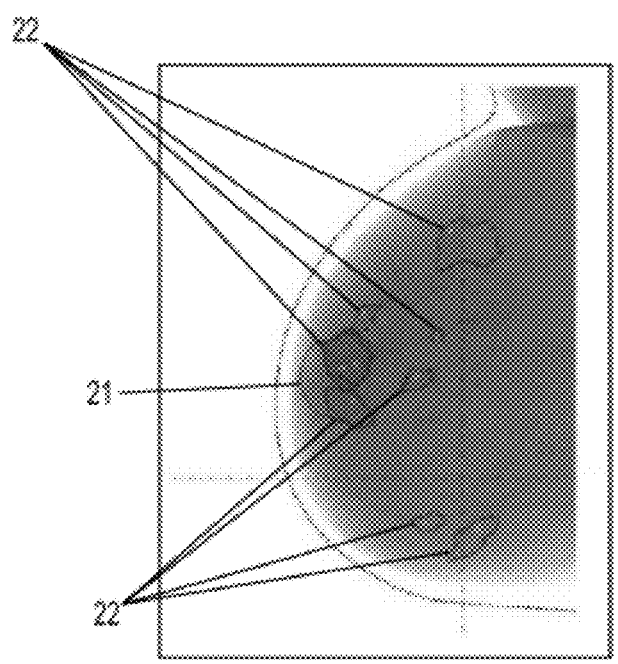
FIG. 2 is a view of the right breast illustrating the concept of multiple candidates pointing to the same ground truth, according to an embodiment of the invention.

A method according to an embodiment of the invention utilizes information about which candidates point to the same underlying ground-truth lesion to extract more statistical power from the data. In particular, a method according to an embodiment of the invention relies on the notion that all the positive candidates with label $y_i = 1$ that point to the same radiologist-marked ground-truth belong to a same positive bag. The training set includes a large number of such bags corresponding to the number of lesions in the ground truth. FIG. 2 is a view of the right breast illustrating the concept of multiple candidates pointing to the same ground truth. The ellipse 21 is the lesion as marked by a radiologist (ground truth). The contours 22 are the candidates generated by a learning algorithm. All the contours 22 which overlap with the ellipse 21 share the same ground truth and may be considered as being in a positive bag. All other candidates in the training data set are negative (i.e. they have a class label $y^i = 0$). Even if one candidate in a positive bag is declared positive by a classifier and displayed to a radiologist, the underlying lesion would be detected.

Thus, a classifier according to an embodiment of the invention should reject as many negative candidates as possible, but instead of insisting that every positive candidate be labeled as positive by the classifier, insist only that the classifier label at least one sample in a bag as a positive, thus leading to the detection of the lesion. This mirrors the CAD objective.

Figure 3A:
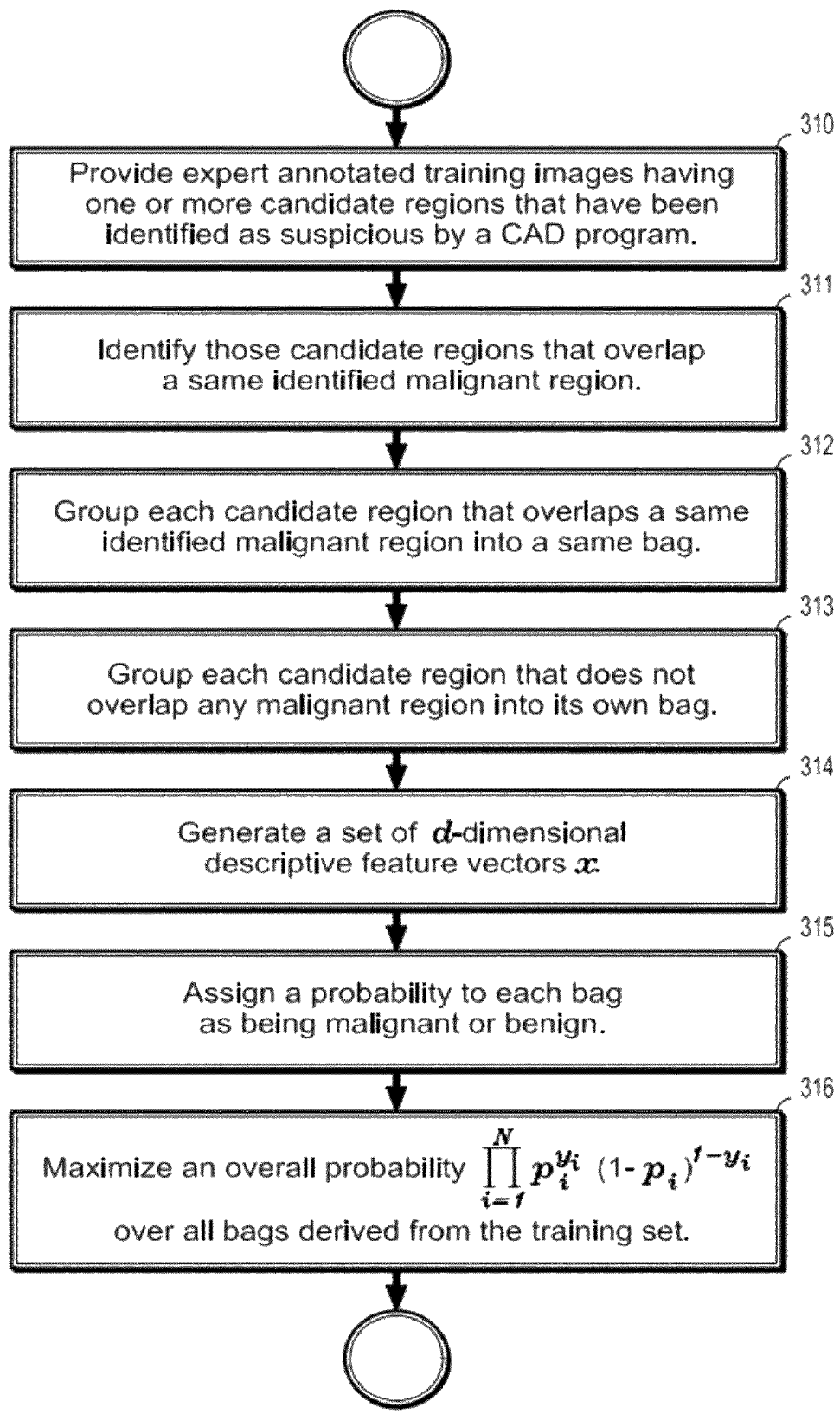
FIGS. 3a-b are flowcharts of a multiple instance method for the classification of candidate regions according to an embodiment of the invention.

A flowchart of a multiple instance learning method according to an embodiment of the invention for training a classifier for classifying candidate regions as malignant or benign is presented in FIG. 3a. Referring now to the figure, a method according to an embodiment of the invention begins by providing, at step 310, a training set of images, each said image including one or more candidate regions that have been identified as suspicious by a candidate generation step of a computer aided diagnosis system, and where each image has been manually annotated by an expert radiologist to identify malignant regions. At step 311, those candidate regions that overlap a same identified malignant region are identified, and each candidate region that overlaps a same identified malignant region is grouped into a same bag at step 312. At step 313, each candidate region that does not overlap any identified malignant region is grouped into its own bag. In addition, a set of d-dimensional descriptive feature vectors x are generated from a feature computation step of a computer aided diagnosis system at step 314, where each candidate region is associated with a feature vector x. There are N bags, and each bag $x_i = \{x_j^i, y_j^i\}_{j=1}^{K_i}$ contains $K_i$ feature vectors $x_j^i$, where $y_j^i$ is a label $y \in \{0,1\}$ where a value of 1 indicates malignancy and 0 otherwise. At step 315, a probability is assigned to each bag as being malignant or benign. The probability of a bag containing a malignant region is $$P(y = 1 \mid x) = 1 - \prod_{j=1}^{K} [1 - p(y = 1 \mid x_j)],$$

and a probability of being benign is $$P(y = 0 \mid x) = \prod_{j=1}^{K} p(y = 0 \mid x_j).$$

At step 316, a probability $$\prod_{i=1}^{N} p_i^{y_i} (1 - p_i)^{1-y_i}$$

is maximized over all bags derived from the training set, wherein N is a number of bags. Applying an appropriate model for the probability results in a classifier suitable for classifying a suspicious region in a new image as malignant or benign.

Logistic Regression

An example of a parametric probability model is logistic regression. The posterior probability for the positive class is modeled as $$p(y=1|x,w) = \sigma(w^T x), \quad (2)$$

where $\sigma(z) = 1/(1+\exp(-z))$ is the logistic sigmoid link function. The notation is overloaded so that $\sigma(z)$ of a vector $z = (z_1, z_2, \ldots, z_N)^T$ denotes the element wise application of the sigmoid function to each element of the vector, i.e., $\sigma(z) = [\sigma(z_1), \sigma(z_2), \ldots, \sigma(z_N)]^T$. More generally, for example, in a two layer neural network, the weight w could comprise a weight matrix $W_1$ and a weight vector $w_2$, so that $p(y=1|x, w = \{W_1, w_2\}) = \sigma(w_2^T \sigma(W_1^T x))$. For binary classification, $p(y=0|x, w) = 1 - p(y=1|x, w)$. Training a classifier implies choosing the weight vector w given the training data D.

Traditional Statistical Learning of Classifiers

The following theory is very general and extends to many non-linear classifier models $p(y|x, w)$ such as Neural Networks, Gaussian Processes, etc. Though a Multiple-Instance Learning method according to an embodiment of the invention has been implemented to extend several baseline classifiers, for succinct presentation this disclosure shall focus on the binary logistic regression model $p(y=1|x, w) = \sigma(w^T x)$. However, it is to be understood that Multiple-Instance Learning methods according to other embodiments of the invention may be extended by one of skill in the art to other such non-linear classifier models.

Logistic Model for MIL

In the MIL framework, all the examples in a bag share the same label, in particular, all candidates which point to a same nodule. A positive bag means at least one example in the bag is positive. The probability that a bag contains at least one positive instance is one minus the probability that all of them are negative. A negative bag means that all examples in the bag are negative. Hence the posterior probability for the positive bag can be written as $$P(y=1|x) = 1 - \prod_{j}^{K} [1-p(y=1|x_j)] \qquad (3)$$

$$= 1 - \prod_{j=1}^{K} [1-\sigma(w^T x_j)],$$

where the bag $x=\{x_j\}_{j=1}^{K}$ contains K examples. This model is sometimes referred to as the noisy-OR model. Hence $$P(y=0|x) = \prod_{j=1}^{K} p(y=0|x_j) \qquad (4)$$

$$= \prod_{j=1}^{K} [1-\sigma(w^T x_j)].$$

Maximum-Likelihood Estimator

Given training data D, the maximum likelihood (ML) estimate for w is given by $$\hat{w}_{ML} = \underset{w}{\operatorname{argmax}} p(D|w) = \underset{w}{\operatorname{argmax}} [\log p(D|w)]. \qquad (5)$$

Define $p_i = p(y_i=1|x_i) = 1 - \pi_{j=1}^{K}[1-\sigma(w^T x_{ij})]$, the probability that the $i^{th}$ bag $x_i$ is positive. Assuming that the training bags are independent the log-likelihood can be written as $$\log p(D|w) = \log \prod_{i=1}^{N} p(y_i|x_i, w) \qquad (6)$$

$$= \log \prod_{i=1}^{N} p_i^{y_i}(1-p_i)^{1-y_i}$$

$$= \sum_{i=1}^{N} [y_i \log p_i + (1-y_i)\log(1-p_i)].$$

Most training algorithms maximize this log-likelihood. However the maximum-likelihood solution in practice can exhibit severe overfitting, especially for high-dimensional data, and for linearly separable classes, there will be multiple solutions which give rise to the same likelihood. This can be addressed by using a prior on w and then finding the maximum a-posteriori (MAP) solution.

Maximum a-Posteriori Estimator

Often one uses a zero mean Gaussian prior $N(w|0;A^{-1})$ on the weights w with inverse-covariance (precision) matrix $A=\operatorname{diag}(\alpha_1 \ldots \alpha_d)$, also referred to as hyper-parameters. Then, the prior is $$p(w) = (2\pi)^{-d/2} |A^{-1}|^{-1/2} \exp\left(-\frac{w^T A w}{2}\right). \qquad (7)$$

This encapsulates our prior belief that the individual weights in w are independent and close to zero with a variance parameter $1/\alpha_i$. As $\alpha_i \to 0$, the prior becomes diffuse: i.e., more or less uniform-resulting in a maximum-likelihood estimate.

However, as $\alpha_i \to \infty$, the prior is sharply concentrated around 0, preventing the magnitude of $\|w\|^2$ from growing large regardless of the training data, reducing the risk of overfitting to the training set.

Once one observes the training data D, the prior will be updated to compute the posterior p(w|D), which can be written as follows, using Bayes's rule:

$$p(w|D) = \frac{p(D|w)p(w)}{\int p(D|w)p(w)dw}.$$

This posterior can then be used to compute predictive distributions, which will typically involve high dimensional integrals. For computational efficiency one could use point estimates of w. In particular the maximum a-posteriori (MAP) estimate is given by $$\hat{w}_{MAP} = \underset{w}{\operatorname{argmax}} [\log p(D|w) + \log p(w)]. \qquad (8)$$

Substituting for the log likelihood from EQ. (6) and the prior from EQ. (7) one has $\hat{w}_{MAP}=\arg\max_w L(w)$, where $$L(w) = \left[\sum_{i=1}^{N}(y_i \log p_i + (1-y_i)\log(1-p_i))\right] - \frac{w^T A w}{2}, \qquad (9)$$

and $$p_i = 1 - \prod_{j \in i} [1-\sigma(w^T x_{ij})]. \qquad (10)$$

Due to the non-linearity of the sigmoid, there is no closed form solution, and gradient-based optimization methods need to be used. According to an embodiment of the invention, a Newton-Raphson update given by $w^{t+1}=w^t-\eta H^{-1}g$ is used, where g is the gradient vector, H is the Hessian matrix, and $\eta$ is the step length. The gradient is given by $$g(w) = \sum_{i=1}^{N}[y_i \beta_i - (1-y_i)]\sum_{j=1}^{K_i} x_{ij}\sigma(w^T x_{ij}) - Aw, \qquad (11)$$

where $\beta_i=(1-p_i)/p_i$. Note that $\beta_i=1$ corresponds to the derivatives of the standard logistic regression updates. These terms $\beta_i$ can be thought of as the bag weight by which each instance weight gets modified. The Hessian matrix is given by $$H(w) = \sum_{i=1}^{N}[y_i \beta_i - (1-y_i)]\sum_{j=1}^{K_i} x_{ij}x_{ij}^T \sigma(w^T x_{ij})\sigma(-w^T x_{ij}) - \qquad (12)$$

$$\sum_{i=1}^{N} y_i \beta_i(\beta_i+1)\left[\sum_{j=1}^{K_i} x_{ij}\sigma(w^T x_{ij})\right]\left[\sum_{j=1}^{K_i} x_{ij}\sigma(w^T x_{ij})\right]^T - A.$$

Note that the Hessian matrix also depends on the class labels, unlike the case of regular logistic regression.

Bayesian MIL: Feature Selection

A prior of the form $p(w)=N(w|0, A^{-1})$ has been chosen, parameterized by d hyper-parameters $A=\text{diag}(\alpha_1 \ldots \alpha_d)$. Clearly, as the precision $\alpha_k \to \infty$, i.e., the variance for $w_k$ tends to zero, thus concentrating the prior sharply at zero. Hence, regardless of the evidence of the training data, the posterior for $w_k$ will also be sharply concentrated on zero, thus that feature will not affect the classification result, hence, it is effectively removed out via feature selection. Therefore, the discrete optimization task corresponding to feature selection can be more easily solved via an easier continuous optimization over the hyper-parameters. If one could maximize the marginal likelihood p(D/A) this would perform optimal feature selection. This approach is also known as the type-II maximum likelihood method in the Bayesian literature.

The hyper-parameters to maximize the marginal likelihood can be chosen as:

$$A = \underset{A}{\text{argmax}}\, p(D\mid A) = \underset{A}{\text{argmax}} \int p(D\mid w)p(w\mid A)dw. \quad (13)$$

Since this integral is not easy to compute for an MIL model according to an embodiment of the invention, an approximation to the marginal likelihood is used via a Taylor series expansion. The marginal likelihood p(D/A) can be written as $p(D|A)=\int \exp(\Psi(w))dw$, where $\Psi(w)=\log p(D|w)+\log p(w|A)$. Approximating $\Psi$ using a second order Taylor series around $\hat{w}_{MAP}$, $$\Psi(w) \approx \Psi(\hat{w}_{MAP}) + \frac{1}{2}(w-\hat{w}_{MAP})H(\hat{w}_{MAP}, A)(w-\hat{w}_{MAP})^T. \quad (14)$$

Hence there is the following approximation to the marginal likelihood:

$$p(D|A) \approx \exp(\Psi(\hat{w}_{MAP})) \quad (15)$$

$$\int \exp\left(\frac{1}{2}(w-\hat{w}_{MAP})H(\hat{w}_{MAP}, A)(w-\hat{w}_{MAP})^T\right)dw$$

$$\approx p(D\mid \hat{w}_{MAP})p(\hat{w}_{MAP}\mid A)(2\pi)^{d/2}|-H(\hat{w}_{MAP}, A)|^{1/2}.$$

Using the prior $p(w/A)=N(w|0, A^{-1})$, the log marginal likelihood can be written as $$\log p(D\mid A) \approx \quad (16)$$

$$\log p(D\mid \hat{w}_{MAP}) - \frac{1}{2}\hat{w}_{MAP}^T A \hat{w}_{MAP} + \frac{1}{2}\log|A| - \frac{1}{2}\log|-H(\hat{w}_{MAP}, A)|.$$

The hyper-parameters A are found by maximizing this approximation to the log marginal likelihood. There is no closed-form solution for this. Hence an iterative re-estimation method is used by setting the first derivative to zero. The derivative can be written as $$\frac{\partial \log p(D\mid A)}{\partial A} = -\frac{1}{2}\hat{w}_{MAP}\hat{w}_{MAP}^T + \frac{1}{2}A^{-1} - \frac{1}{2}H^{-1}(\hat{w}_{MAP}, A). \quad (17)$$

Since $A\, \text{diag}(\alpha_1 \ldots \alpha_d)$, one can further simplify $$\frac{\partial \log p(D\mid A)}{\partial A} = -\frac{1}{2}\left(\hat{w}_i^2 - \frac{1}{\alpha_i} + \Sigma_{ii}\right), \quad (18)$$

where $\Sigma_{ii}$ is the $i^{th}$ diagonal element of $H^{-1}(\hat{w}_{MAP}, A)$. Assuming $\Sigma_{ii}$ does not depend on A, a simple update rule for the hyper-parameters can be written by equating the first derivative to zero:

$$\alpha_i^{new} = \frac{1}{w_i^2 + \Sigma_{ii}}. \quad (19)$$

A logistic regression model according to an embodiment of the invention with the above feature selection is known as a Relevance Vector Machine (RVM). An RVM algorithm according to an embodiment of the invention has two levels of iterations: in an outer loop one updates the hyper-parameters $\alpha_i$, and in an inner loop one finds the MAP estimator $\hat{w}_{MAP}$ given the hyper-parameters. After a few iterations one finds that some of the hyper-parameters, which are the inverse variances of the priors, for several features tend to infinity. This means that for those $w_i \to 0$ one can simply remove those irrelevant features from further consideration in future iterations.

Figure 3B:
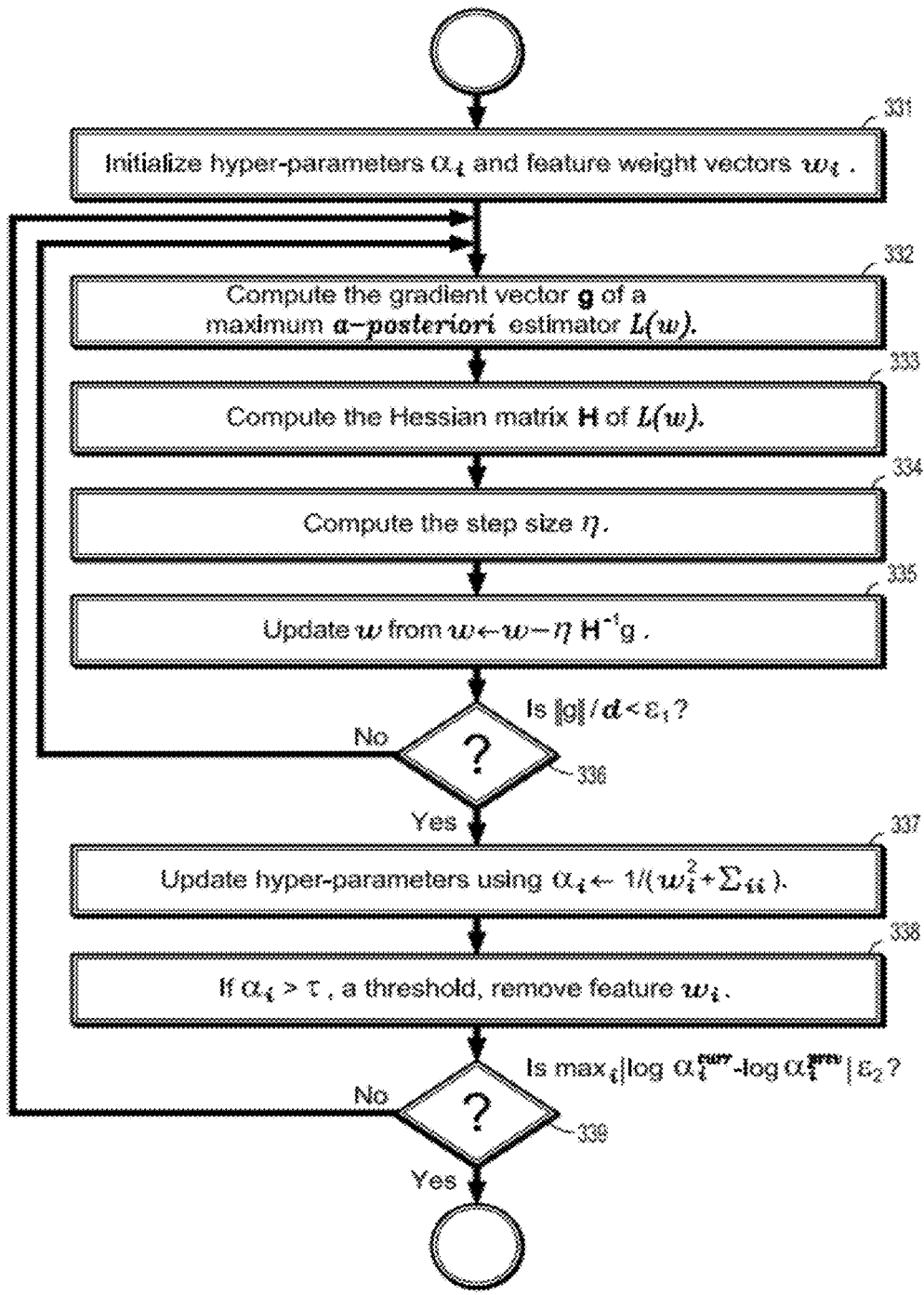

A flowchart of an RVM algorithm according to an embodiment of the invention is shown in FIG. 3b. It is to be understood that this is but one embodiment for applying MIL to the task training a classifier that uses information about the number of candidate regions that overlap a same expert identified malignant region. Those of skill in the art can easily extend the teachings presented herein to incorporate other training methods, such as neural networks, and to apply other probability models, and other methods of optimization. An RVM algorithm according to an embodiment of the invention assumes there are N bags $\{x_i, y_i\}_{i=1}^N$, where $x_i=\{x_{ij} \in R^d\}_{j=1}^{K_i}$ is a bag containing $K_i$ instances that share the same label $y_i \in \{0,1\}$. Referring now to the figure, an algorithm begins at step 331 by initializing the hyper-parameters and weight vectors as $\alpha_i=1$ and $w_i=0$ for i=1, ..., d. The next steps 332 to 335 are the inner loop that estimates the MAP using the selected features. At step 332, the gradient vector g of L(w) is computed from EQ. (11). At step 333, the Hessian matrix H of L(w) is computed from EQ. (12). At step 334, the step size $\eta$ is computed using a line search. At step 335, w is updated using $w \leftarrow w - \eta H^{-1}g$. At step 336, the comparison $\|g\|/d < \epsilon_1$ is performed, and steps 332 to 335 are repeated until the comparison is true. At step 337, the hyper-parameters are updated using $\alpha_i \leftarrow 1/(w_i^2 + \Sigma_{ii})$ (EQ. (19)). At step 338, if $\alpha_i > \tau$, a threshold, feature $w_i$ is removed. At step 339, the comparison $\max_i |\log \alpha_i^{curr} - \log \alpha_i^{prev}| > \epsilon_2$ is performed, and the outer loop of step 332 to 338 is repeated until the comparison is true. The output is a list of selected features and weight vector w for the linear classifier. Exemplary, non-limiting values of $\tau, \epsilon_1, \epsilon_2$ are $\tau=10^{12}, \epsilon_1=10^{-5}, \epsilon_2=10^{-3}$.

Multi-Task Learning

There are often cases where there is a shortage of training data for learning classifiers for a task. However, there may be additional data for closely related, albeit non-identical tasks.

For example, in CAD applications where one needs to identify early stage cancers from CT scans, the data set may includes images from CT scanners with two different reconstruction kernels. Exemplary datasets with different reconstruction kernels may be referred to as B50 and B60.

While training the classifier, one could ignore this information and pool all the data together. However, there are some systematic differences that make the feature distributions in these type of cases slightly different. Alternatively, one could train a separate classifier for each kernel, but a large part of the data set may be from one particular kernel and a smaller data set may be from the other kernel.

Alternatively, another approach according to another embodiment of the invention tries to estimate models W for several classification tasks j in a joint manner. Multi-task learning can compensate for small sample size by using additional samples from related tasks, and exchanging statistical information between tasks. In a hierarchical Bayesian approach, the classifiers share a common prior $p(w^j|A)$. A separate classifier is trained for each task. The maximum a-posteriori estimate for $w^j$ for the $j^{th}$ task is $$\hat{w}^j_{MAP} = \operatorname{argmax}_w \left( \left[ \sum_{i=1}^N (y/\log p_i^j + (1-y_i^j)\log(1-p_i^j)) \right] - \frac{w^{j,T} A w^j}{2} \right), \quad (20)$$

with $$p_i^j = 1 - \prod_{k \in i} [1 - \sigma(w^{j,T} x_{ik}^j)].$$

However the optimal hyper-parameters of the shared prior are estimated from all the data sets simultaneously during the training. The update equation becomes, instead of EQ. (19):

$$\alpha_i^{new} = \frac{1}{\Sigma_{task\ j}\left((w_i^j)^2 + \Sigma_{ii}^j\right)}. \quad (21)$$

Run-Time Efficiency

An algorithm according to an embodiment of the invention are orders of magnitude faster than other MIL methods, and has no free parameters to tune. The runtime of an algorithm according to an embodiment of the invention scales as $O(d^3)$ with the number of features, because of the need to compute the inverse of the d×d Hessian matrix.

An algorithm according to an embodiment of the invention can converge upon an optimal feature subset within about 10 iterations of the outer loop. Using a simple Newton-Raphson optimizer, for a fixed, the inner loop finds the MAP estimator in about 5-8 iterations. On a 1 GHz laptop, an entire algorithm according to an embodiment of the invention, including automatic feature selection, converges in under a minute even on training data sets with over 10,000 patients. A system according to an embodiment of the invention needs no human intervention or tuning even to decide on the number of features to be used in the eventual classifier.

Experimental Results
Datasets

Experiments were performed on four common benchmark data sets from the MIL literature. These datasets are summarized inn the table of FIG. 4. For each dataset, the table lists the number of features d, the number of m positive examples, the number of positive bags, the number of negative examples, and the number of negative bags.

The Musk1 and Musk2 datasets were used to predict whether a new drug molecule will bind to a target protein. However each molecule (bag) can have many different low energy shapes (instances) of which only one can actually bind with the target.

The Elephant and Tiger datasets were used to search a repository to find images that contain objects of interest. An image is represented as a bag. An instance in a bag corresponds to a segment in the image; the object of interest is contained in at least one segment.

Competing Algorithms

Various learning algorithms have been adapted to the multiple learning scenario. An algorithm according to an embodiment of the invention was compared with a variant of Boosting, SVM, and Logistic Regression. Specifically, experimental comparison was performed for the following algorithms.

MI RVM: This is a multiple-instance algorithm with feature selection according to an embodiment of the invention. This is completely automatic and does not require tuning any parameters.

RVM: This is an algorithm according to an embodiment of the invention without multiple instance learning. This is same as MI RVM but every example is assigned to a unique bag.

MI: This is a multiple-instance algorithm according to an embodiment of the invention without feature selection. Here, $A=\lambda I$, where I is the identity matrix and $\lambda$ is chosen by five-fold cross-validation.

MI Boost: This is a variant of the AdaBoost algorithm adapted for the multiple instance learning scenario. It was boosted for 50-100 rounds.

MI SVM: This is a bag-level SVM variant for MIL. A publicly available implementation, originally available at http://www.cs.cmu.edu/~juny/MILL, was used, with a linear kernel and regularization parameters chosen by 5-fold cross-validation.

MI LR: This is a variant of Logistic Regression which uses the soft-max function to combine posterior probabilities over the instances of a bag. The soft-max function used was $\alpha=3$. Non-linear conjugate gradient with tolerance set at $10^{-3}$ was used as the optimization routine.

Of all the above algorithms only a method according to an embodiment of the invention and the boosting method perform automatic feature selection. The inventors are not aware of any other multiple-instance algorithms which perform automatic feature selection.

Evaluation Procedure

Figures 4, 5A:
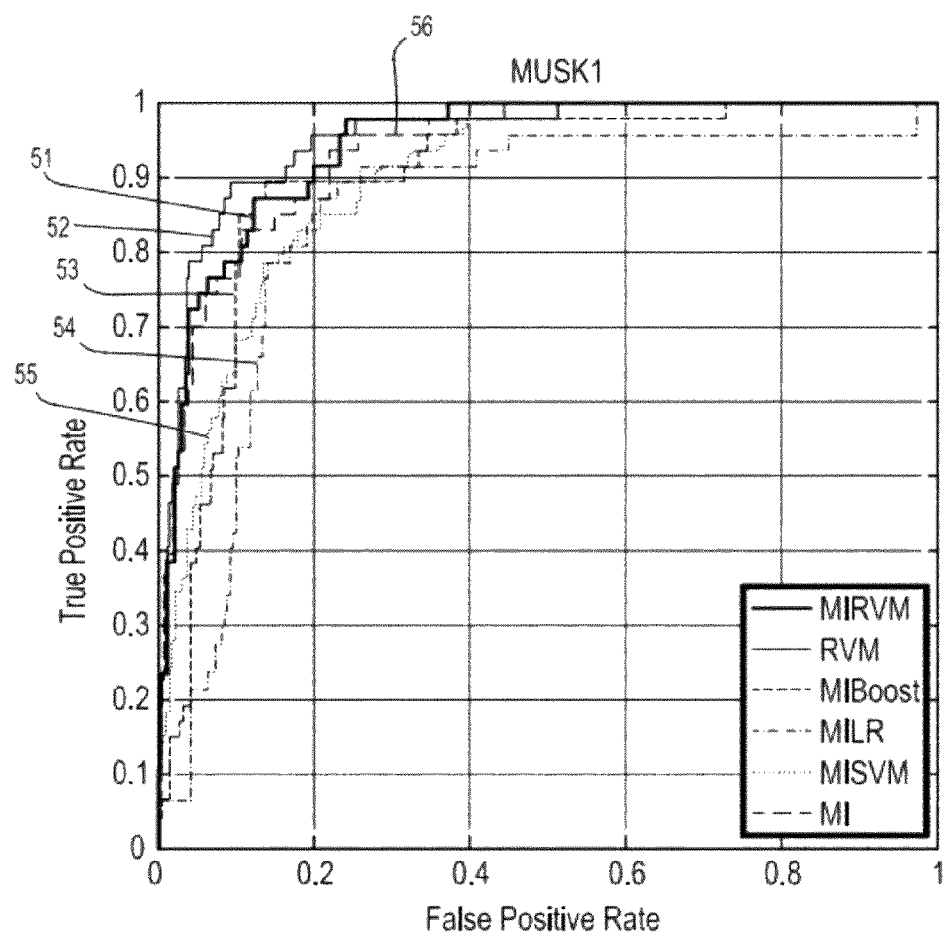
FIG. 4 is a table showing the datasets used in the MIL experiments, according to an embodiment of the invention.
FIGS. 5(a)-(d) are graphs of ROC Curves for the different data sets and different algorithms used in the MIL experiments, according to an embodiment of the invention.
Figure 5B:
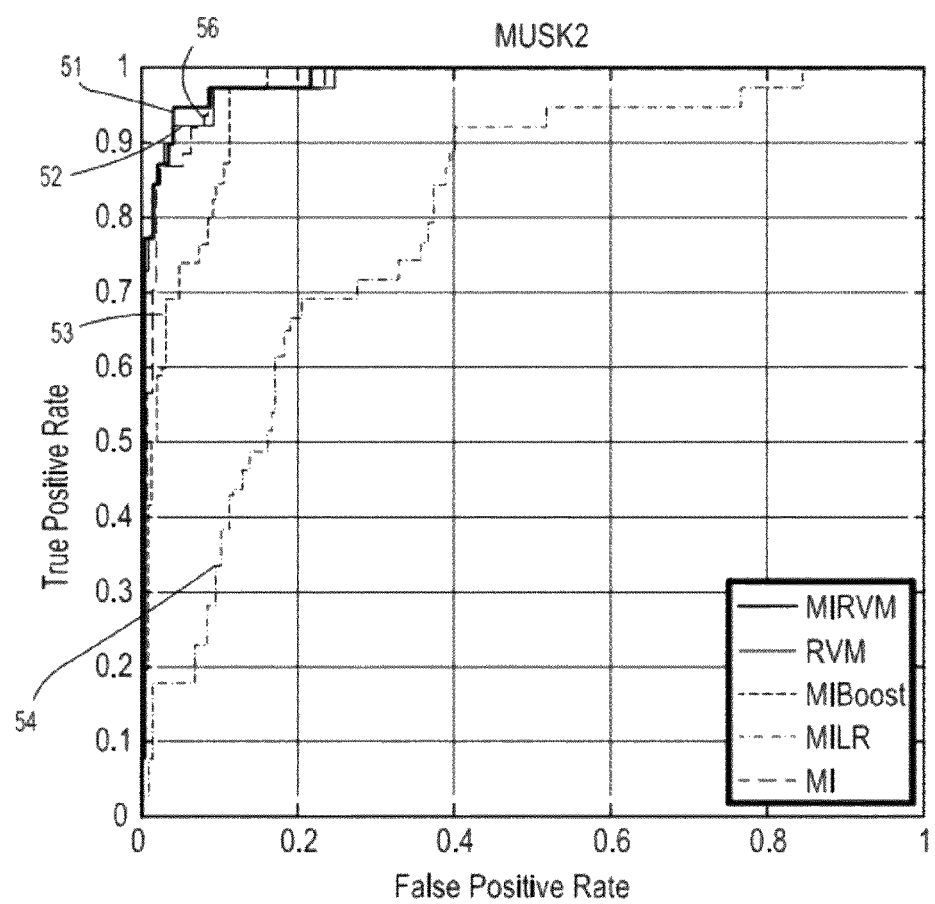
Figure 5C:
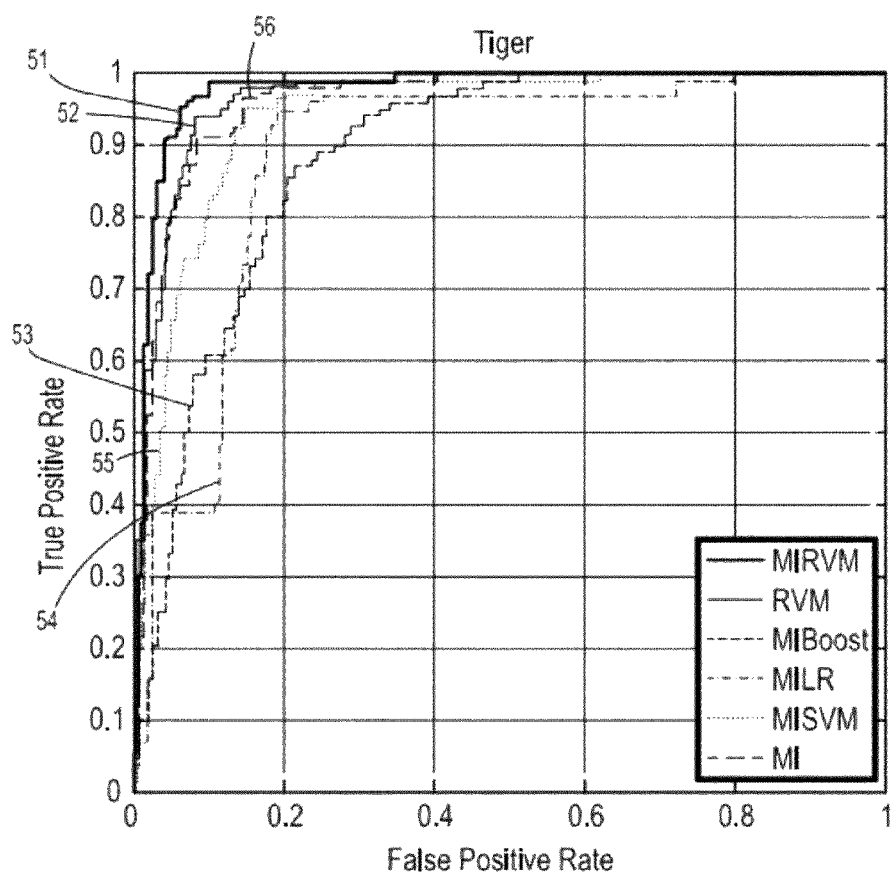
Figure 5D:
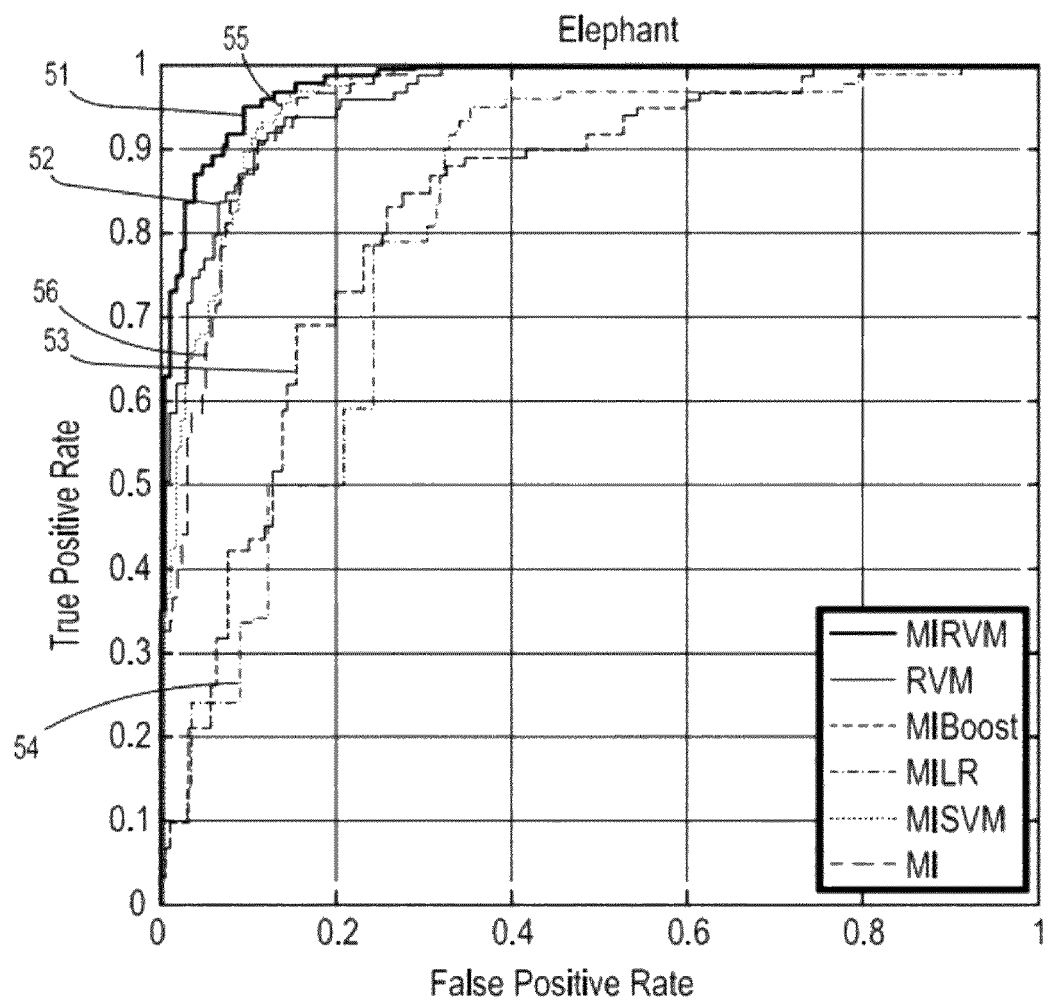

The results are shown for a 10-fold stratified cross-validation. The folds are split at the positive bag level, so that examples in the same positive bag will not be split. Receiver Operating Characteristic (ROC) curves for each of the datasets (Musk1, Musk2, Tiger, and Elephant) were plotted for each of the various algorithms in FIGS. 5(a)-(d). FIG. 5(a) depicts Musk1 set results, FIG. 5(b) depicts Musk2 set results, FIG. 5(c) depicts Tiger set results, and FIG. 5(b) depicts Elephant set results, and for each dataset, curve 51 depicts MI RVM results, curve 52 represents RVM results, curve 53 represents MI Boost results, curve 54 represents MI LR results, curve 55 represents MI SVM results, and curve 56 represents MI results. The ROC curve is a plot of False Positive Rate (FPR) vs. True Positive Rate (TPR) as the decision threshold of the classifier $\theta$ is varied from $\infty$ to $-\infty$. The TPR is computed on a bag level, i.e., a bag is predicted as positive if at least one on the instances in classified as positive. The ROC curve is plotted by pooling the prediction of the algorithm across all folds. The area under the ROC curve (AUC) is presented in the table of FIG. 5 for each algorithm and each dataset.

Comparison with Other Methods

From FIGS. 5 and 6 it may be seen that among other MIL algorithms, the ROC for a method according to an embodiment of the invention dominates the other methods. However it is interesting to note that plain RVM is better than MI RVM for the Musk 1 and Elephant data sets. This confirms an observation that for some MIL benchmarks, a standard supervised learning algorithm may be more accurate than a MIL algorithm.

Number of Features Selected

The table shown in FIG. 7 compares the number of features selected by a MI RVM, RVM, and the MI Boost algorithms according to an embodiment of the invention for each of the datasets. It can be seen that a MI RVM algorithm according to an embodiment of the invention selects the least number of features. Selecting features in a multiple instance setting reduces the number of features selected by half.

Does Feature Selection Help?

From the table of FIG. 6 it may be seen that the AUC with feature selection is higher than that without feature selection. Thus one can achieve better performance and at the same time use a smaller set of features.

As stated above, an algorithm according to an embodiment of the invention and the MI Boost are orders of magnitude faster than other MIL methods. As a result MI, SVM, and MI LR could not be run on CAD experiments described in the next section.

Multiple Instance Learning for CAD

The candidate generation step very often produces many candidates which are spatially close to each other. For example, FIG. 1 shows two PEs appearing in a CT scan. All these candidates point to the same ground truth and can be considered to share the same label for training. A single instance classifier can be trained using the labeled candidates. According to an embodiment of the invention, a multiple instance learning algorithm is used by recognizing the fact that all candidates which point to the same radiologist mark can be considered as a positive bag. There is another reason why MIL is a natural framework for CAD. As stated above, the candidate generation step produces many spatially close candidates. Even if one of these is highlighted to the radiologist and other adjacent or overlapping candidates are missed, the underlying embolism would still have been detected. Hence, while evaluating the performance of CAD systems a bag level sensitivity is used, i.e., a classifier is successful in detecting an embolism if at least one of the candidates pointing to it is predicted as a PE. MIL naturally lends itself to model the desired accuracy measure during training itself.

Another requirement is that the run time of the classifier during testing should be as fast as possible. The candidate generation step generally produces thousands of candidates for a CT scan. Computing all the features can be very time-consuming. Hence the final classifier should use as few features as possible without any decrease in the sensitivity. A classifier according to an embodiment of the invention can automatically select features for multiple-instance classification.

CAD Experiments

Figures 8, 9:
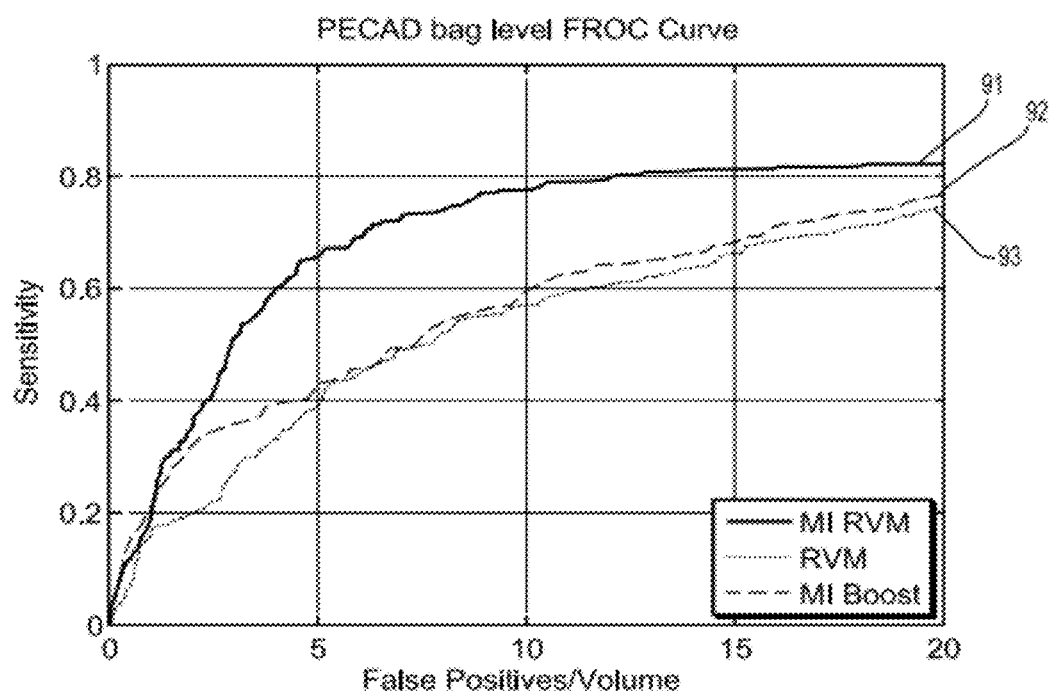
FIG. 8 is a table showing the datasets used in the PE CAD MIL experiments, according to an embodiment of the invention.
FIG. 9 is a graph of the bag level FROC curve for the PE CAD validation set, according to an embodiment of the invention.

The table of FIG. 8 summarizes the PE CAD data sets used in these experiments. Note that unlike the previous four data sets, there are no negative bags. Every negative example is considered a negative bag. The classifier is trained on the training set and tested on a separate validation set. Since one is interested in the number of False Positives per volume (patient), the Free response ROC (FROC) curves are plotted for the validation set in FIG. 9, with curves for the MI RVM 91, MI Boost 92, and RVM 93. An MI RVM according to an embodiment of the invention gives an improvement over a single instance RVM approach according to an embodiment of the invention and also the MI Boost method. The MI SVM and MI LR could not be run for the large CAD data set. An MI RVM algorithm according to an embodiment of the invention selected 21 features in contrast to the 34 features selected by the single instance RVM algorithm according to an embodiment of the invention.

Multi-Task Learning Experiments

Figure 10:
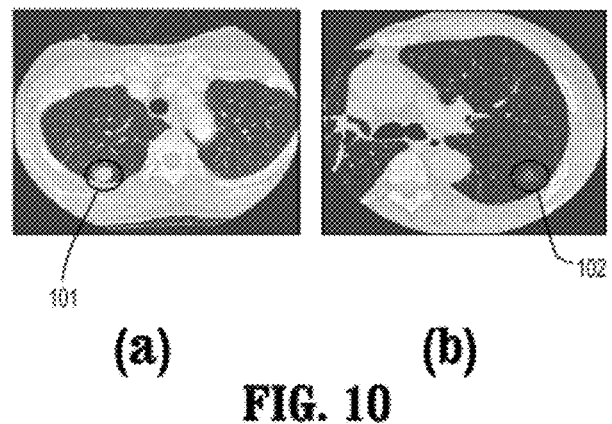
FIGS. 10(a)-(b) depicts a lung CT image showing a sample nodule and GGO, according to an embodiment of the invention.

Lung cancer is a leading cause of cancer related death in western countries. However early detection can substantially improve survival. Automatic CAD systems can be developed to identify suspicious regions such as solid nodules or ground-glass opacities (GGO) in CT scans of the lung. A solid nodule is defined as an area of increased opacity more than 5 mm in diameter which completely obscures underlying vascular marking. Ground-glass opacity (GGO)) is defined as an area of a slight, homogenous increase in density, which does not obscure underlying bronchial and vascular markings. FIGS. 10(*a*)-(*b*) shows an example nodule 101 in FIG. 10(*a*) and a GGO 102 in FIG. 10(*b*).

Figure 11:
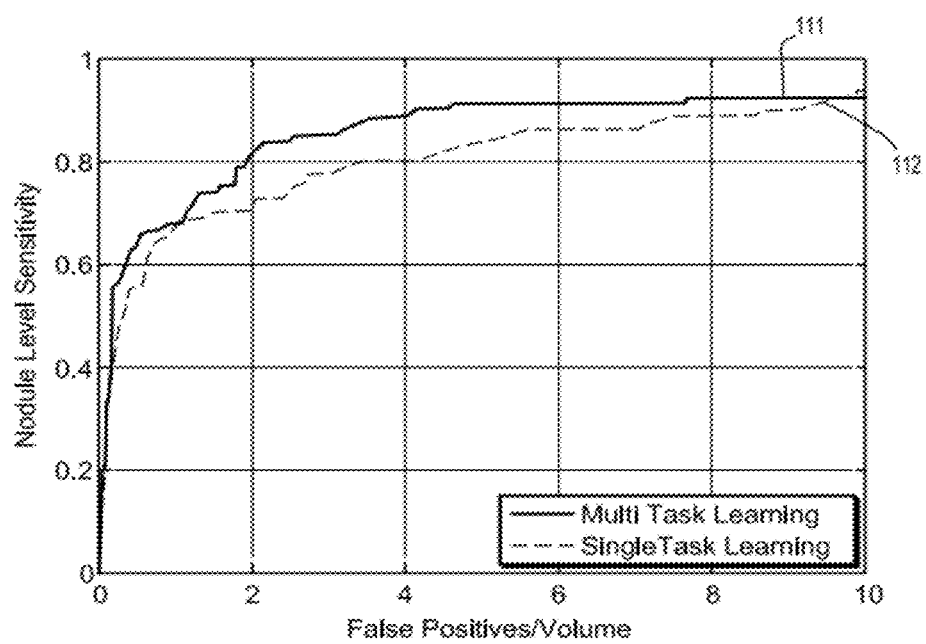
FIG. 11 is a graph of the bag level FROC curve for the validation set of the multi-task learning experiments, according to an embodiment of the invention.

Detecting nodules and GGOs are two closely related tasks although each has its own respective characteristics. Hence, multi-task learning is likely to be beneficial, even when building a specific model for each task. To train such a system, 15 CT scans were used which included GGOs and 23 CT scans were used that included nodules. The model accuracy was validated on a held out set of 86 CT scans that included nodules. FIG. 11 compares the FROC curves for nodule detection systems designed in two different ways: (1) Single task learning, where the classifier was trained using only nodule data (curve 112); and (2) Multi-task learning, where the classifier was trained using nodule data and GGO data (curve 111). As FIG. 11 shows, inductive transfer using a method according to an embodiment of the invention improves the accuracy of the multiple instance learning system, when there is a limited amount of training data.

Accuracy

An algorithm according to an embodiment of the invention was compared against a state-of-the-art linear SVM classifier and against a feature selection approach to non-MIL baseline logistic-regression according to an embodiment of the invention. Each system was trained using a small proprietary digital mammography (FFDM) data set with 144 biopsy-proven malignant-mass cases and 2005 normal cases from BI-RADS® 1 and 2 categories. The CG and feature extraction steps produced 127,509 candidates in total, each described by a set of 81 numerical features. The systems were evaluated on a held-out set of 108 biopsy-proven malignant cases and 1513 BI-RADS® 1 and 2 cases. A MIL algorithm according to an embodiment of the invention automatically performed feature selection and only selected 40 features out of the original set of 81 features, while the non-MIL variant selected 56 features. No human intervention or cross-validation tuning was necessary for an algorithm according to an embodiment of the invention. The regularization parameter of the SVM was tuned using 10-fold cross validation on the training set, and the optimal parameter was used to train a single SVM on the entire data.

Figure 12:
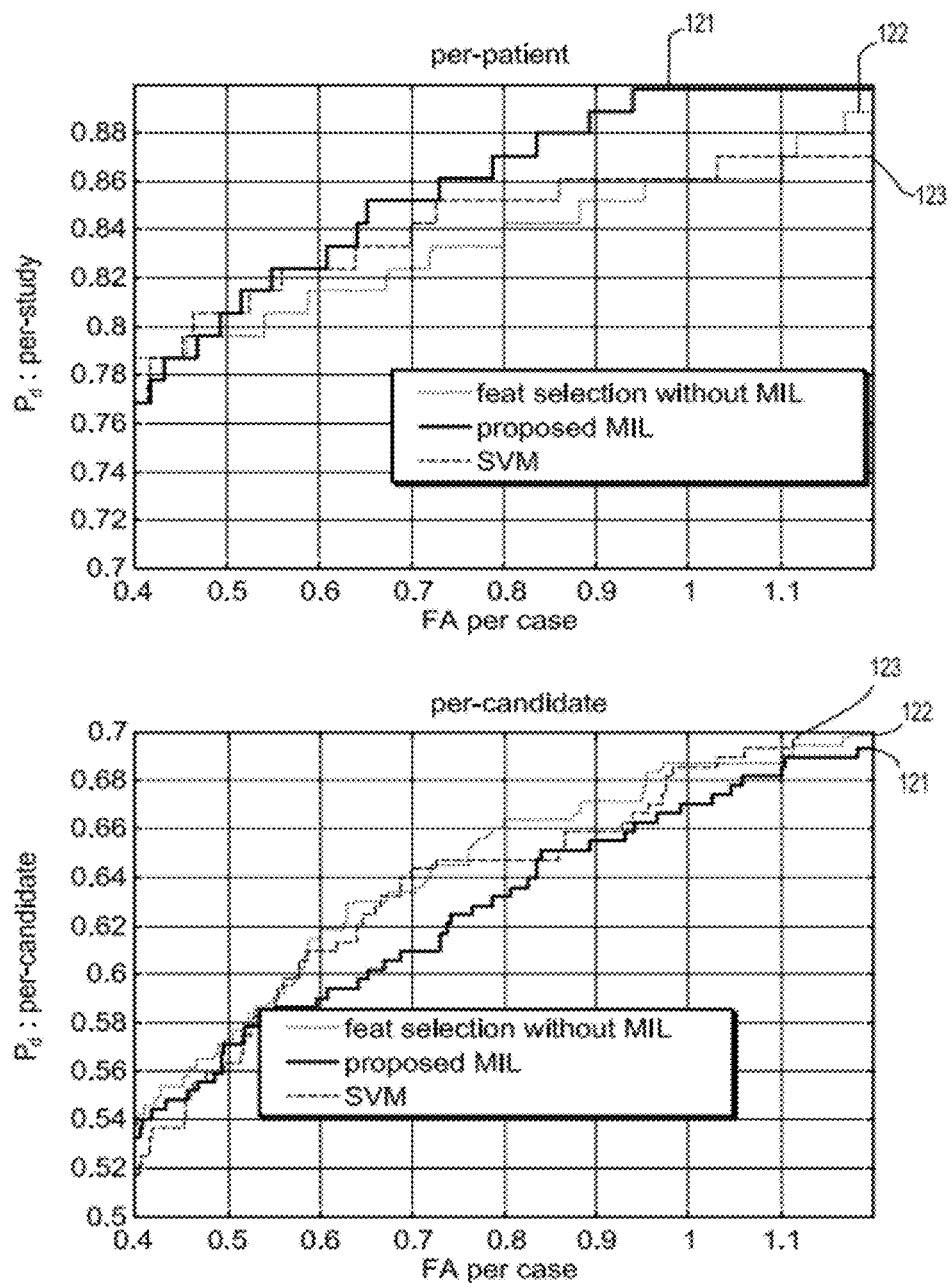
FIG. 12 are graphs of the FROC curves for a MIL classifier with automatic feature selection, a linear SVM and a feature selection approach without MIL.

FIG. 12 depicts FROC curves for an algorithm according to an embodiment of the invention with automatic feature selection 121, a linear SVM 123 and a feature selection approach without MIL according to an embodiment of the invention 122. The upper figures shows FROC curves for per-patient statistics, and the lower figure shows FROC curves for per-candidate statistics. As seen in FIG. 12, an algorithm according to an embodiment of the invention improves per-patient statistics at the cost of deteriorating per-candidate statistics, and was more accurate when measured in terms of per-patient (and although not shown, per-image) FROCs. As expected, this statistically significant improvement on per-patient statistics comes at the cost of deteriorating the per-candidate statistics. However, in CAD one cares about a different set of performance metrics that are not optimized in conventional methods, and an algorithm according to an embodiment of the invention optimizes them. Note that one can optimize either per-lesion, per-patient, or per-image statistics: one simply describes the unique bag-ID of a candidate in terms of the ID of the lesion, patient or image using the same code to accomplish this. An algorithm according to an embodiment of the invention is fast, easy to implement, very general and broad in terms of CAD applicability, and it can support many different baseline learning algorithms, including non-linear and/or multi-class methods, such as Neural Nets, kernel classifiers, etc.

System Implementation

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 13:
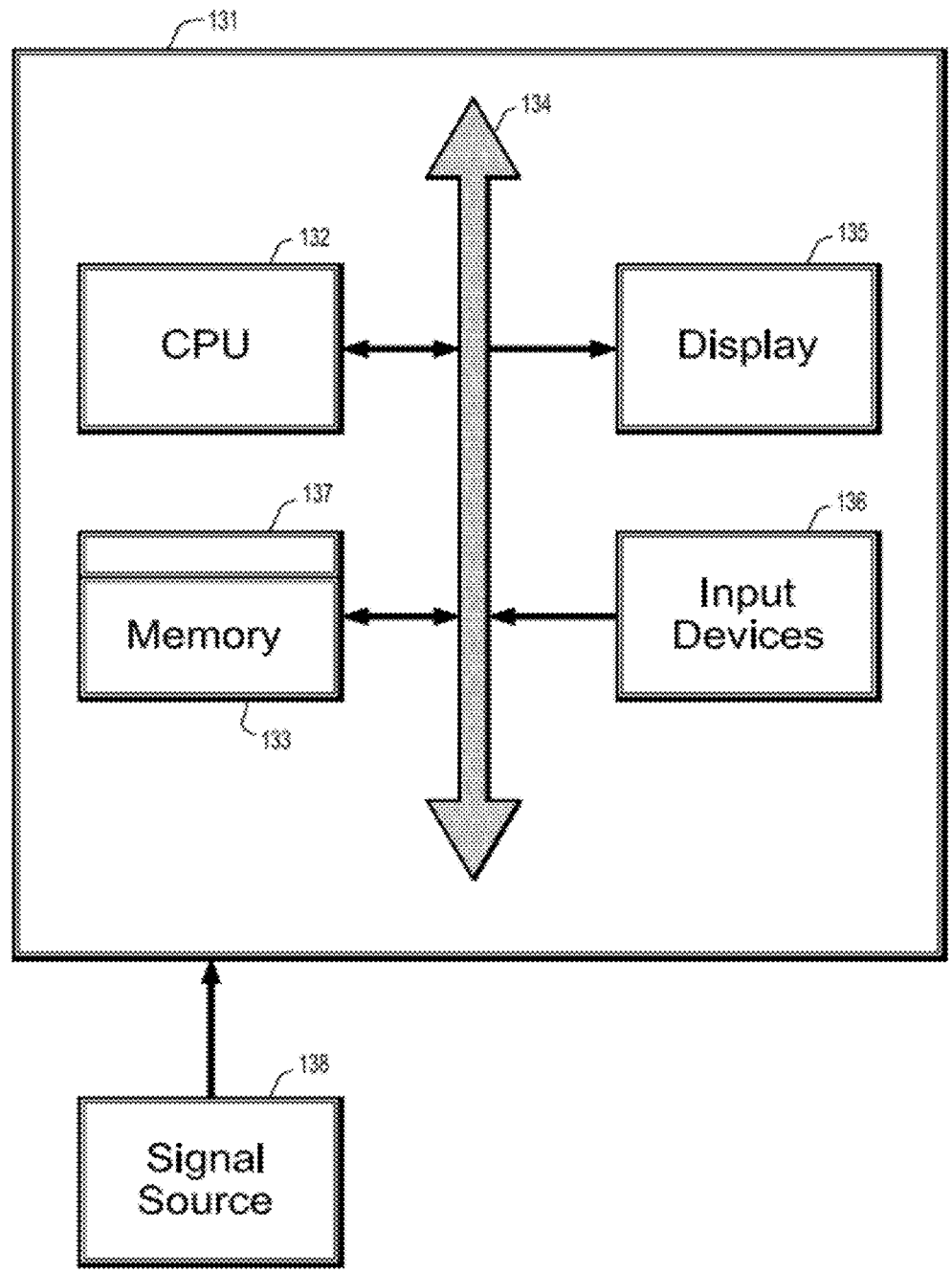
FIG. 13 is a block diagram of an exemplary computer system for implementing a multiple instance method for the classification of candidate regions in computer aided diagnosis, according to an embodiment of the invention.

FIG. 13 is a block diagram of an exemplary computer system for implementing a multiple instance method for the classification of candidate regions in computer aided diagnosis according to an embodiment of the invention. Referring now to FIG. 13, a computer system 131 for implementing the present invention can comprise, inter alia, a central processing unit (CPU) 132, a memory 133 and an input/output (I/O) interface 134. The computer system 131 is generally coupled through the I/O interface 134 to a display 135 and various input devices 136 such as a mouse and a keyboard. The support circuits can include circuits such as cache, power supplies, clock circuits, and a communication bus. The memory 133 can include random access memory (RAM), read only memory (ROM), disk drive, tape drive, etc., or a combinations thereof. The present invention can be implemented as a routine 137 that is stored in memory 133 and executed by the CPU 132 to process the signal from the signal source 138. As such, the computer system 131 is a general purpose computer system that becomes a specific purpose computer system when executing the routine 137 of the present invention.

The computer system 131 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for training a classifier for classifying candidate regions in computer aided diagnosis of digital medical images, said method comprising the steps of:

providing a training set of images, each said image including one or more candidate regions that have been identified as suspicious by a candidate generation step of a computer aided diagnosis system, and wherein each said image has been manually annotated to identify malignant regions; and using information about the number of candidate regions that overlap a same identified malignant region to train a classifier, wherein said classifier is adapted to classifying a suspicious region in a new image as malignant or benign.

2. The method of claim 1, wherein training said classifier comprises: identifying those candidate regions that overlap a same identified malignant region;

grouping each candidate region that overlaps the same identified malignant region into a same bag;

grouping each candidate region that does not overlap any identified malignant region into its own bag;

associating a probability to each bag as being malignant or benign; and maximizing this probability over all images of the training set.

3. The method of claim 2, further comprising deriving a set of d-dimensional descriptive feature vectors x from a feature computation step of a computer aided diagnosis system, wherein each candidate region is associated with a feature vector x, and wherein a probability that a bag is malignant is $$p(y=1\mid x)=1-\prod_{j=1}^{K}[1-p(y=1\mid x_j)],$$

wherein $y \in \{0,1\}$ is a label where a value of 1 indicates malignancy and 0 otherwise, bag $x=\{x_j\}_{j=1}^{K}$ contains K feature vectors $x_j$, and a probability that a bag is benign is $$p(y=0\mid x)=\prod_{j=1}^{K}p(y=0\mid x_j),$$

and the probability to be maximized is $$\log\prod_{i=1}^{N}p_i^{y_i}(1-p_i)^{1-y_i}=\sum_{i=1}^{N}[y_i\log p_i+(1-y_i)\log(1-p_i)],$$

wherein N is a number of bags.

4. The method of claim 3, wherein maximizing said probability comprises:

modeling said probability $p_i$ as a logistic sigmoid $\sigma(w_i^T x_i)=1/(1+\exp(-w_i^T x_i))$ wherein w is a weight vector that weights the contribution of each component of x, wherein w has a zero-mean Gaussian prior $N(w|0, A^{-1})$ with an inverse covariance matrix $A=\text{diag}(\alpha_1 \ldots \alpha_d)$; and finding a w that minimizes $$L(w) = \left[\sum_{i=1}^{N} (y_i \log p_i + (1-y_i)\log(1-p_i))\right] - \frac{w^T A w}{2}.$$

5. The method of claim 4, wherein minimizing L(w) comprises performing a Newton-Raphson update $w \leftarrow w - \eta H^{-1} g$, wherein g is a gradient of L(w), H is a Hessian matrix of L(w), and η is a step size, wherein w is updated until a ratio $\|g\|/d$ is less than a predetermined constant.

6. The method of claim 4, further comprising finding $\alpha_i$ that maximizes a marginal likelihood p(D|A) of A over said training bags D defined as $$p(D|A) = \int \left(\prod_{i=1}^{N} p_i^{y_i}(1-p_i)^{1-y_i}\right)(N(w|0, A^{-1}))dw; \text{ and}$$

removing a feature weight vector $w_i$ if an associated $\alpha_i$ is greater than a predetermined threshold value, wherein a remaining set of features weight vectors w is a weight vector for a linear classifier $f_w(x) = w^T x$.

7. The method of claim 6, wherein finding $\alpha_i$ that maximizes p(D|A) comprises:
calculating a Hessian matrix $H(\hat{w}_{MAP}, A)$ of p(D|A); and
updating said hyper-parameters from $$\alpha_i^{new} = \frac{1}{w_i^2 + \Sigma_{ii}},$$

wherein $\Sigma_{ii}$ is the $i^{th}$ diagonal element of $H^{-1}(\hat{w}_{MAP}, A)$, and wherein $\Sigma_{ii}$ does not depend on A.

8. The method of claim 6, further comprising:
providing one or more additional training sets of $M^j$ bags $\{x_i^j\}_{i=1}^{M^j}$;
finding $w^j$ that maximizes $$\left[\sum_{i=1}^{N}(y_i^j \log p_i^j + (1-y_i^j)\log(1-p_i^j))\right] - \frac{w^{j,T} A w^j}{2},$$

wherein $$p_i^j = 1 - \prod_{k \in i}[1 - \sigma(w^{j,T} x_{ik}^j)]; \text{ and}$$

updating $$\alpha_i^{new} = \frac{1}{\sum_{\text{task } j}((w_i^j)^2 + \Sigma_{ii}^j)},$$

wherein $w_i^j$ is an $i^{th}$ feature weight vector of a $j^{th}$ training set, $\Sigma_{ii}$ is the $i^{th}$ diagonal element of an inverse Hessian matrix $H^{-1}$ of p(D|A), and wherein $\Sigma_{ii}$ does not depend on A.

9. The method of claim 6, further comprising repeating the finding of w that minimizes L(w) for each $\alpha_i \in \{\alpha_1, \ldots, \alpha_d\}$, and repeating said steps of finding $w_i$ for each $\alpha_i$, finding the $\alpha_i$ that maximizes said marginal likelihood p(D|A), and removing a feature vector $x_i$ until the $\alpha_i$'s have converged in value.

10. A method for training a classifier for classifying candidate regions in computer aided diagnosis of digital medical images, said method comprising the steps of:
providing a training set of images, each said image including one or more candidate regions that have been identified as suspicious by a candidate generation step of a computer aided diagnosis system, and wherein each said image has been manually annotated to identify malignant regions; and
applying multiple instance learning to train a classifier to classify suspicious regions in a new image as malignant or benign by identifying those candidate regions that overlap a same identified malignant region grouping each candidate region that overlaps the same identified malignant region into a same bag, and maximizing a probability $$P = \prod_{i=1}^{N} p_i^{y_i}(1-p_i)^{1-y_i},$$

wherein N is a number of bags, $p_i$ is a probability of a bag i containing a candidate region that overlaps with an identified malignant region, and $y_i$ is a label wherein $y \in \{0,1\}$ wherein a value of 1 indicates malignancy and 0 otherwise.

11. The method of claim 10, further comprising:
deriving a set of d-dimensional descriptive feature vectors x from a feature computation step of a computer aided diagnosis system, wherein each candidate region is associated with a feature vector x;
grouping each candidate region that does not overlap any identified malignant region into its own bag; and
maximizing said probability P over all images in said training set using information about the number of candidate regions that overlap the same identified malignant region, wherein a probability that a bag is malignant is $$p(y=1|x) = 1 - \prod_{j=1}^{K}[1 - p(y=1|x_j)],$$

wherein bag $x = \{x_j\}_{j=1}^{K}$ contains K feature vectors $x_j$, and a probability that a bag is benign is $$p(y=0|x) = \prod_{j=1}^{K} p(y=0|x_j).$$

12. A program storage device readable by a computer, tangibly embodying a program of instructions executable by the computer to perform the method steps for training a classifier for classifying candidate regions in computer aided diagnosis of digital medical images, said method comprising the steps of:
providing a training set of images, each said image including one or more candidate regions that have been identified as suspicious by a candidate generation step of a computer aided diagnosis system, and wherein each said image has been manually annotated to identify malignant regions; and using information about the number of candidate regions that overlap a same identified malignant region to train a classifier, wherein said classifier is adapted to classifying a suspicious region in a new image as malignant or benign.

13. The computer readable program storage device of claim 12, wherein training said classifier comprises:

identifying those candidate regions that overlap a same identified malignant region;

grouping each candidate region that overlaps the same identified malignant region into a same bag;

grouping each candidate region that does not overlap any identified malignant region into its own bag;

associating a probability to each bag as being malignant or benign; and maximizing this probability over all images of the training set.

14. The computer readable program storage device of claim 13, the method further comprising deriving a set of d-dimensional descriptive feature vectors x from a feature computation step of a computer aided diagnosis system, wherein each candidate region is associated with a feature vector x, and wherein a probability that a bag is malignant is $$p(y=1 \mid x) = 1 - \prod_{j=1}^{K} [1 - p(y=1 \mid x_j)],$$

wherein $y \in \{0,1\}$ is a label where a value of 1 indicates malignancy and 0 otherwise, bag $x = \{x_j\}_{j=1}^{K}$ contains K feature vectors $x_j$, and a probability that a bag is benign is $$p(y=0 \mid x) = \prod_{j=1}^{K} p(y=0 \mid x_j),$$

and the probability to be maximized is $$\log \prod_{i=1}^{N} p_i^{y_i}(1-p_i)^{1-y_i} = \sum_{i=1}^{N} [y_i \log p_i + (1-y_i)\log(1-p_i)],$$

wherein N is a number of bags.

15. The computer readable program storage device of claim 14, wherein maximizing said probability comprises:

modeling said probability $p_i$ as a logistic sigmoid $\sigma(w_i^T x_i) = 1/(1+\exp(-w_i^T x_i))$ wherein w is a weight vector that weights the contribution of each component of x, wherein w has a zero-mean Gaussian prior $N(w|0, A^{-1})$ with an inverse covariance matrix $A = \text{diag}(\alpha_1 \ldots \alpha_d)$; and finding a w that minimizes $$L(w) = \left[\sum_{i=1}^{N} (y_i \log p_i + (1-y_i)\log(1-p_i))\right] - \frac{w^T A w}{2}.$$

16. The computer readable program storage device of claim 15, wherein minimizing L(w) comprises performing a Newton-Raphson update $w \leftarrow w - \eta H^{-1} g$, wherein g is a gradient of L(w), H is a Hessian matrix of L(w), and $\eta$ is a step size, wherein w is updated until a ratio $\|g\|/d$ is less than a predetermined constant.

17. The computer readable program storage device of claim 15, the method further comprising finding $\alpha_i$ that maximizes a marginal likelihood p(D|A) of A over said training bags D defined as $$p(D \mid A) = \int \left(\prod_{i=1}^{N} p_i^{y_i}(1-p_i)^{1-y_i}\right)(N(w \mid 0, A^{-1})) dw; \text{ and}$$

removing a feature weight vector $w_i$ if an associated $\alpha_i$ is greater than a predetermined threshold value, wherein a remaining set of features weight vectors w is a weight vector for a linear classifier $f_w(x) = w^T x$.

18. The computer readable program storage device of claim 17, wherein finding $\alpha_i$ that maximizes p(D|A) comprises:

calculating a Hessian matrix $H(\hat{w}_{MAP}, A)$ of p(D|A); and
updating said hyper-parameters from $$\alpha_i^{new} = \frac{1}{w_i^2 + \Sigma_{ii}},$$

wherein $\Sigma_{ii}$ is the $i^{th}$ diagonal element of $H^{-1}(\hat{w}_{MAP}, A)$, and wherein $\Sigma_{ii}$ does not depend on A.

19. The computer readable program storage device of claim 17, the method further comprising:

providing one or more additional training sets of $M^j$ bags $\{x_i^j\}_{i=1}^{M^j}$;

finding that maximizes $$\left[\sum_{i=1}^{N} (y_i^j \log p_i^j + (1-y_i^j)\log(1-p_i^j))\right] - \frac{w^{j,T} A w^j}{2},$$

wherein $$p_i^j = 1 - \prod_{k \in i} [1 - \sigma(w^{j,T} x_{ik}^j)]; \text{ and}$$

updating $$\alpha_i^{new} = \frac{1}{\sum_{\text{task } j} \left((w_i^j)^2 + \Sigma_{ii}^j\right)},$$

wherein $w_i^j$ is an $i^{th}$ feature weight vector of a $j^{th}$ training set, $\Sigma_{ii}$ is the $i^{th}$ diagonal element of an inverse Hessian matrix $H^{-1}$ of p(D|A), and wherein $\Sigma_{ii}$ does not depend on A.

20. The computer readable program storage device of claim 17, the method further comprising repeating the finding of w that minimizes L(w) for each $\alpha_i \in \{\alpha_1, \ldots, \alpha_d\}$, and repeating said steps of finding $w_i$ for each $\alpha_i$, finding the $\alpha_i$ that maximizes said marginal likelihood p(D|A), and removing a feature vector $x_i$ until the $\alpha_i$'s have converged in value.

* * * * *